United States Patent [19]

Lieber et al.

[11] Patent Number: 5,179,275
[45] Date of Patent: Jan. 12, 1993

[54] METHOD FOR MEASURING LIGHT BEING COUPLED INTO AND OUT OF A LIGHT WAVEGUIDE

[75] Inventors: Winfried Lieber, Krailling; Gervin Ruegenberg, Munich, both of Fed. Rep. of Germany

[73] Assignee: Siemens Aktiengesellschaft, Munich, Fed. Rep. of Germany

[21] Appl. No.: 783,400

[22] Filed: Oct. 28, 1991

[30] Foreign Application Priority Data

Nov. 13, 1990 [DE] Fed. Rep. of Germany ....... 4036105

[51] Int. Cl.⁵ .................... H01J 5/16; G01N 21/59
[52] U.S. Cl. ................... 250/227.24; 356/73.1
[58] Field of Search ............ 250/227.24; 356/73.1; 385/32, 48

[56] References Cited

U.S. PATENT DOCUMENTS

| | | | |
|---|---|---|---|
| 4,652,123 | 3/1987 | Neumann | 356/73.1 |
| 4,659,217 | 4/1987 | Shen et al. | 356/73.1 |
| 4,679,907 | 7/1987 | Campbell et al. | 385/32 |
| 4,696,535 | 9/1987 | Saha | 385/32 |
| 4,708,476 | 11/1987 | So et al. | 356/73.1 |
| 4,790,617 | 12/1988 | Campbell et al. | 385/32 |
| 4,848,872 | 7/1989 | Shigematsu et al. | 385/32 |
| 4,945,776 | 8/1990 | Yamada et al. | 356/73.1 |
| 5,009,479 | 4/1991 | Morrison | 250/227.24 |
| 5,078,489 | 1/1992 | Lieber | 356/73.1 |

Primary Examiner—David C. Nelms
Assistant Examiner—John R. Lee
Attorney, Agent, or Firm—Hill, Van Santen, Steadman & Simpson

[57] ABSTRACT

During an initial pressure application on a light waveguide with a coating, which waveguide is subjected to a flexional coupling, deformation of the coating will occur and the value of an outfed light from the light waveguide will change as the deformation changes. The final intensity of the outfed light is obtained during the deformation of the coating by a process of extrapolating the final value from the initial measured values occurring during the initial deformation of the coating.

3 Claims, 3 Drawing Sheets

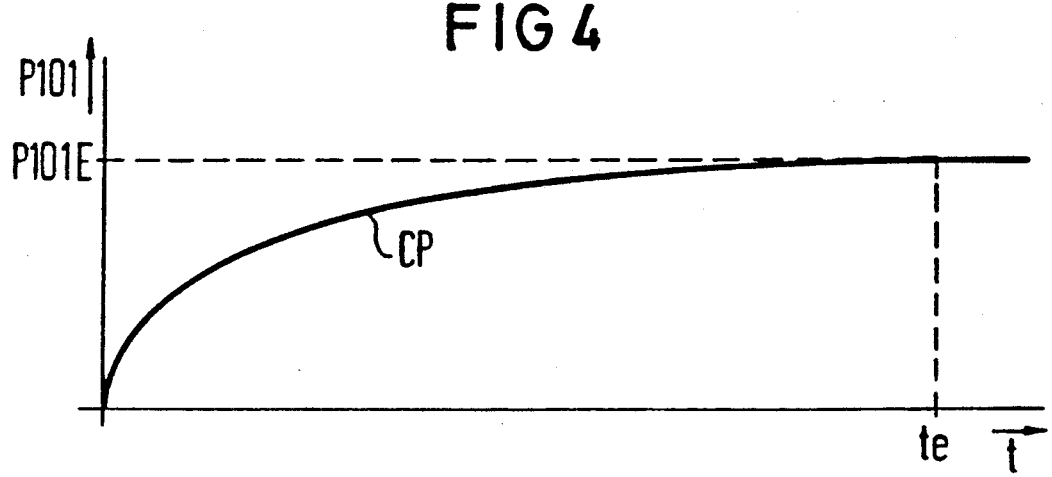
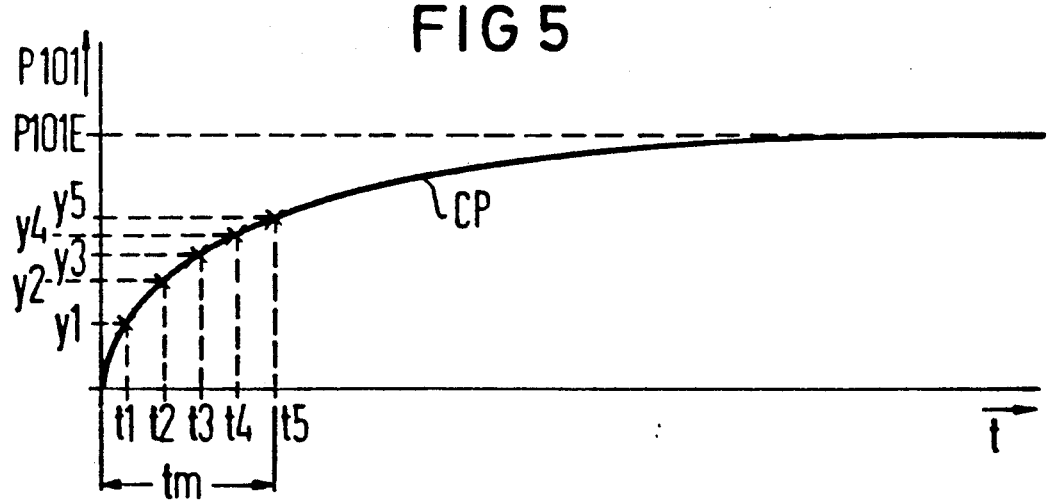

METHOD FOR MEASURING LIGHT BEING COUPLED INTO AND OUT OF A LIGHT WAVEGUIDE

BACKGROUND OF THE INVENTION

The present invention is directed to a method for infeeding and outfeeding light into and out of a light waveguide provided with a resilient coating with a device having at least one flexional coupler with which a pressure is exerted onto the coating of the light waveguide in order to produce a curved contour in the waveguide for outcoupling light therefrom which outfed light is evaluated in a measuring instrument.

Measuring methods wherein flexional couplers are employed are disclosed, for example, in allowed U.S. patent application Ser. No. 07/394,114, filed Aug. 15, 1989, which issued as U.S. Pat. No. 5,078,489 on Jan. 7, 1992, whose disclosure is incorporated herein by reference thereto, and which claims priority from German Application 38 28 604, and also in U.S. Pat. No. 4,652,123, whose disclosure is incorporated herein by reference thereto. As presented in detail in these two references, particularly exact results can be achieved when work is carried out with two transmitters and two receivers and a plurality of measurements are successively implemented proceeding from both sides of the unit under test.

This and all similar measuring methods are based on the measuring principle that the coupling of the receiver means or receivers and of the transmitter or transmitters occurs with at least one so-called flexional coupler, whereby the light waveguide experiences a deformation in the measuring region. The light emerging in the deformation region is acquired by the receiver and is offered to the measuring equipment for evaluation. The light is picked up by a rigidly arranged light receiver, for example a photodetector, and is offered for evaluation. At the transmitter, the deformed region of the light waveguide is situated in the radiation field of a light source. The amount of light which is coupled in or, respectively, coupled out is dependent on the spatial allocation of the light waveguide proceeding bent in the coupling region to the light receiver and is also dependent on the refractive index condition and on the geometry of the optical boundary surface in the flexional coupler insofar as no matching of refractive index, such as by immersion or elastic material, occurs. In and of itself, the measuring instrument is operational immediately after the mechanical actuation of the flexional coupler, for example after the closing of a cover, and the measurements could be immediately undertaken.

It has been shown, however, that the values obtained become all the more imprecise when the earlier measurement is undertaken after the bending of the light waveguide into the coupling position. Investigations have lead to the conclusion that a chronological variation of the infeed or, respectively, outfeed efficiency apparently occurs, namely in that a deformation, for example a flowing of the coating of the light waveguide, occurs at the coating of the light waveguide under the pressure of the element, for example an arbor, bending beam or pin, that effects the mechanical bending of the light waveguide and that this mechanical modification, however slight, modifies the position of the deformed region relative to the light source or, respectively, relative to the light receiver, in one instance, and in another instance, influences the geometry of the optical boundary surface. One could, in fact, eliminate such error influences in that one waits until the deformation of the coating has ceased because the final condition of the radiation field in the direction toward the photodetector is reached and a chronological change of the measured signals can no longer be identified, given a constant transmission signal.

SUMMARY OF THE INVENTION

The object of the present invention is to improve the method of measuring so that the desired measured results can be obtained without unnecessary dead time, but, nonetheless, be reliable.

This object is inventively achieved in that the intensity of the outfed light is measured during the deformation of the coating occurring as a consequence of the exerted pressure and that this measurement is ended before the final condition of the pressure-dependent formation has been reached and that the final measured value obtainable in the final condition is identified by extrapolation from the measured values acquired during the deformation.

In this way, it is no longer necessary to wait until the coating of the light waveguide is compressed to its final condition including all the flowing. Instead, the measuring process can be begun immediately after the light waveguide is bent into the coupling position. As a result of the extrapolation occurring based on the acquired measured values, moreover, other respective differences, which may occur, are also taken into consideration, for example, measurements for light waveguides having different coating materials. In accordance with the method of the invention, these measurements can be quickly and reliably carried out and the measured result itself is available with high precision. The invention can, therefore, be employed with particular advantages where high measuring precision can be achieved from the very offset, such as, for example, in the measuring method disclosed in the above-mentioned copending U.S. patent application Ser. No. 07/394,114.

Other advantages and features of the invention will be readily apparent from the following description of the preferred embodiments, the drawings and claims.

BRIEF DESCRIPTION OF THE DRAWINGS

FIG. 4 is a graph illustrating the outfed power versus time; and

FIG. 5 is a graph similar to FIG. 4 showing the measuring positions of the measuring points for an exemplary embodiment of the method of the present invention.

DESCRIPTION OF THE PREFERRED EMBODIMENTS

The principles of the present invention are particularly useful in a measuring device MG that contains two flexional couplers, shown in cross section, to act on two light waveguides LW1 and LW2. These two light waveguides LW1 and LW2 have an optical medium OM disposed therebetween, which optical medium may be, for example, a splice, a transmission link, a coupler or the like, whose attenuation is to be identified.

It is assumed in the present example that the transmission signal is, likewise, coupled via a flexional coupler. However, it is also possible to couple the transmission signal into the end face of the light waveguide, such as LW1, at, for example, the end of the light waveguide. The flexional coupler SE of the transmission side comprises a lower part UTS and an upper part in the form of a cover DES, between which the light waveguide LW1 is guided. This coated light waveguide LW1 is pressed firmly by an arbor or cylindrical pin DOS into a depression in the lower part UTS and the waveguide LW1 is in contact in this depression with the incoupling means PKS, for example a light emitting diode. The coupler on the transmission side works in the form of a flexional coupler. However, it is also possible to implement the coupling in of the transmission side at the end face of the light waveguide LW1. As a result of the coupling, light is coupled into the light waveguide and travels in the direction of arrow P100 with a given intensity.

After passing through the optical medium OM, a part of the transmission signal P100 is coupled out via the reception coupler EM, which, likewise, is a flexional coupler in the form of an arbor DOE that presses the light waveguide LW2 against a depression in the lower part UTE of the coupling means at the reception side. The arbor DOE is contained in the hingeable cover DEE and the light waveguide LW2 is firmly pressed against the lower part UTE when the cover DEE is lowered. An adequately firm pressing of the light waveguide LW2 occurs. An adequately high pressure PR is required in order to insure the defined position of the waveguide LW2 in the coupling region. The light, which is emerging from the light waveguide LW2, due to bending, is to be picked up by a reception means, for example a photodiode PDE that is stationarily arranged in the coupling region and is dimensioned and aligned so that it picks up an optimum quantity of the emerging light. The optimization of the light-sensitive reception means PDE is, thus, designed for the final condition, for example less light is picked up in a transition region wherein the deformation of the coating of the light waveguide has not yet been completed than with a pick-up in a "steady state" with the finished deformation.

Figure 2:
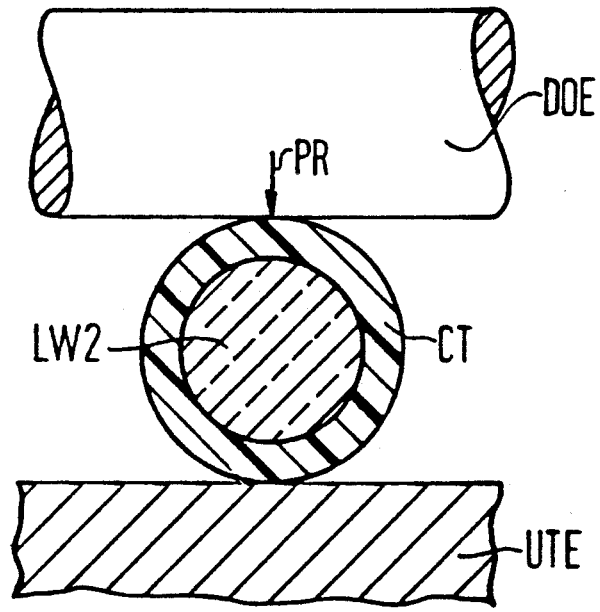
FIG. 2 is a cross sectional view with portions in elevation for purposes of illustration taken along the lines II—II of FIG. 1 at the beginning of deformation of the light waveguide.
Figure 3:
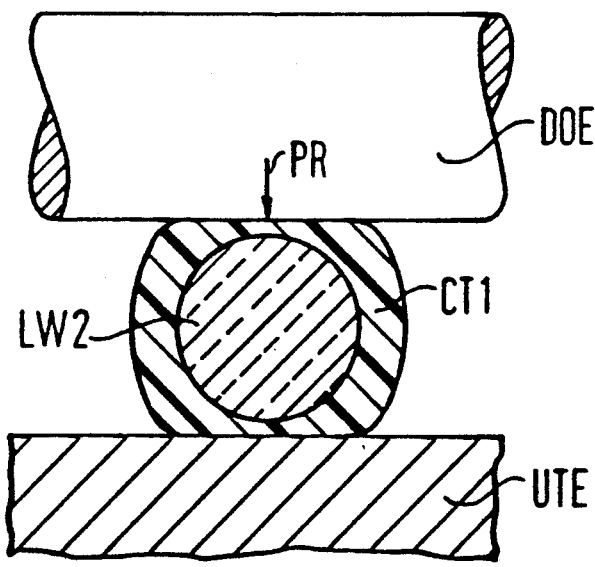
FIG. 3 is a cross sectional view with portions in elevation similar to FIG. 2 after the end of the deformation.

To explain the relationships, reference is made to FIG. 2. The light waveguide LW2 is being pressed against the lower part UTE by the arbor DOE, whereby the arbor DOE just touches the surface of the coating CT of the waveguide. Since an adequately great pressure must be exerted, as indicated by the arrow PR, a flowing or, respectively, deformation of the coating CT will occur, given a somewhat longer-lasting influence of the arbor DOE. The coating CT will assume the distribution in its ultimate condition that is shown in FIG. 3 by the coating CT1, in which a part of the coating material has migrated at the top and bottom and has been pressed into the free region or gap region between the arbor DOE and the lower part UTE. The non-uniform distribution of the coating material, as illustrated by the deformed coating CT1, will, thus, occur overall. Although only the coupling at the receiver has been referenced here for the explanation, the same considerations, of course, are also valid for the coupling in the transmission side, wherein the arbor DOS, the light waveguide LW1 and the deformation of the coating thereof will occur.

Exact measurements in the final condition could, thus, only be implemented when the coating has reached the ultimate condition referenced CT1. This will occur, roughly, in the order of magnitude of 1 to 5 minutes, given current standard coatings.

Figure 1:
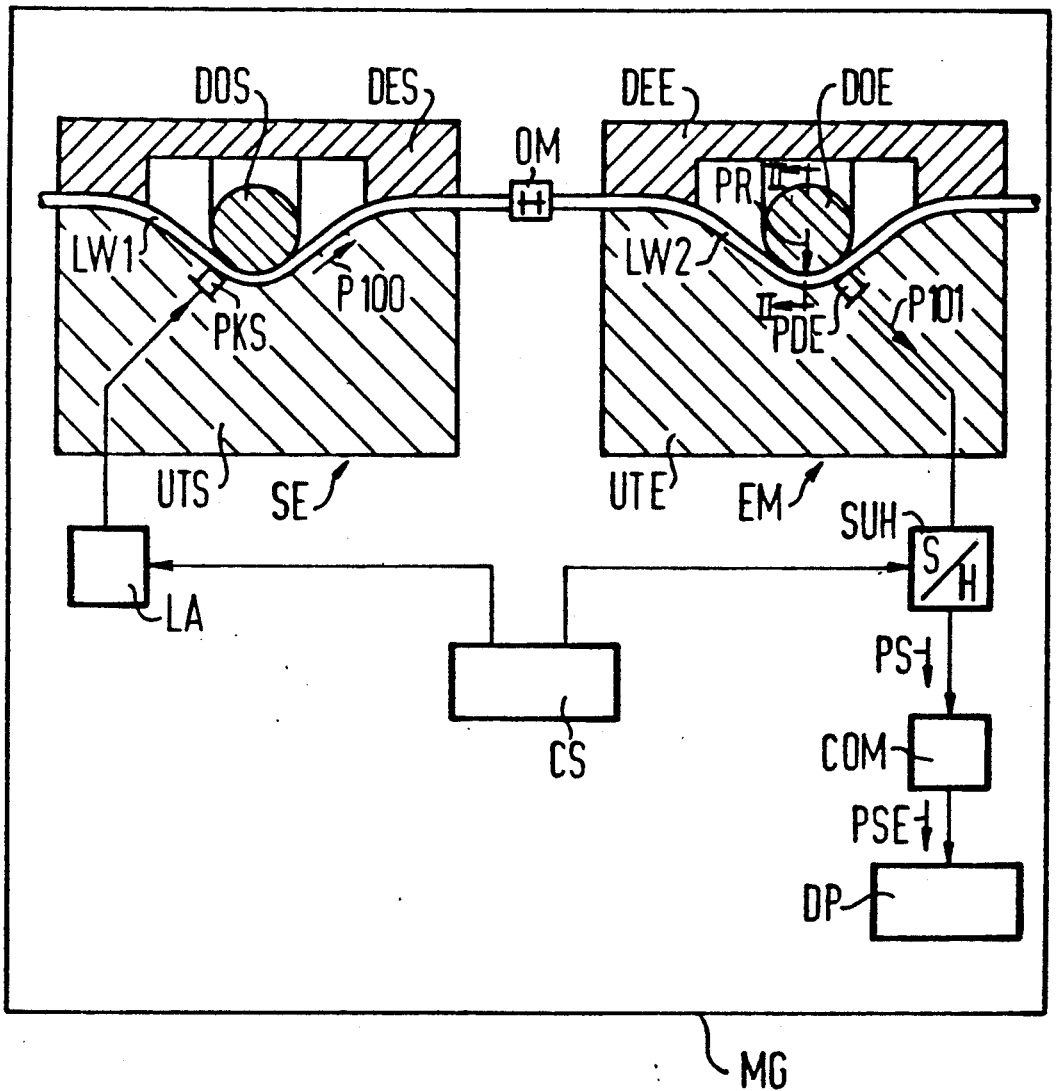
FIG. 1 is a schematic illustration of the structure of a measuring instrument for the implementation of the method of the invention.

In order to avoid having to wait this length of time, which is the fiber specific dead time, measurements according to the present invention are begun immediately after the closing of the covers DEE and DES of the coupling EM and SE, respectively. The chronological curve of the reception level is acquired, for example by sampling individual measuring points at short time intervals with the sample and hold circuit SUH of FIG. 1. The measured values PS at each of these intervals are then conducted to a calculating means COM, for example a microcomputer, which values PS are derived from the reception signal in this way. This calculating means COM calculates a non-linear function from the supplied measured values PS by regression and obtains a final value PSE, which is expanded therefrom by extrapolation. The value to be displayed is derived from this extrapolated value PSE, which is acquired taking the material characteristics of the fiber coating into consideration, and this value is displayed to the operator on a display means DP. A common clock generator CS controls the chronological execution of a drive LA at the transmission side and the sample and hold circuit SUH at the reception side.

What is referred to as a non-linear regression, which shall be forth in greater detail below with reference to an example, is especially suited for the non-linear extrapolation.

A curve CP of the measured level P101 upon incorporation of the flow of the deformation of the light waveguide coating is shown in FIG. 4, with the increase value being plotted against time t. The final value, i.e., after the conclusion of the flow or, respectively, of the deformation, of the quantity P101E is only achieved after a relatively long time and the illustrated curve corresponds to the course of an e-function. If one wishes to measure precisely, one would, thus, have to wait at least until the time te (dead time) has passed, for example until the curve CP has largely approximated the value P101E.

By contrast, work in the invention is completely different, for example the measuring procedure is begun immediately after the closing of the coupling means EM or, respectively, SE of the receiver and/or of the transmitter. The measurements thus occur in a region wherein the arbor DOE and/or DOS of FIG. 1 has not yet reached its ultimate position. Measurement is, thus, already carried out before the deformation process of the coating has ended and this, of course, yields the configuration shown in FIG. 3 after a number of minutes. The measuring time tm itself is relatively short at a rate significantly shorter than the dead time te of FIG. 4 and, for example, amounts to only 10 seconds.

The curve CP can be described as the following equation:

$$y = a(1 - e^{-t/b}) \qquad (1)$$

When it is assumed that the level values y1, y2... y5 of FIG. 5 were obtained in succession for the various temporal values t1, t2... t5 within the short measuring time tm, namely according to the following table:

| t1 = 1 | t2 = 2 | t3 = 3 | t4 = 4 | t5 = 5 seconds |
|--------|--------|--------|--------|----------------|
| y1 = 1.0 | y2 = 1.65 | y3 = 2.1 | y4 = 2.4 | y5 = 2.6 (V) | then the region of the curve CP obtained or acquired by the measured value y1 through y5 enables an identification of the coefficients a, b, particularly on the basis of a non-linear regression. In this example, approximately a=3 and b=2.5 occurs with a regression according to the method of least error square (the algorithm for this is described in Dr. Marquardt: "An Algorithm for at Least Square Estimation of Non-Linear Parameters", *J. Soc. Indust. and Appl. Math.*, Vol. 11, No. 2, 1963).

The calculated function of the curve CP, thus, reads:

$$y = 3(1 - e^{-0.4t}).$$

The final value ye=3 is derived therefrom for the time t→∞ as the non-linear extrapolated value, i.e., corresponding to P101E in FIGS. 4 and 5.

Instead of the above-described, non-linear regression, the coefficients a and b of the function y can also, for example, be calculated by a linear approximation of the e-function in the measuring interval. The measuring interval must thereby be selected relatively short in that, for example, only the measured value y3 through 65 are employed. By linear regression, one first obtains a straight line having the equation:

$$y_1 = a_1 + b_1 \cdot t$$

wherein $a_1 = 1.367$ and $b_1 = 0.25$ for these values. In the middle of the interval under consideration (for t=4), this straight line has the function value $y_1 = 2.367$ and the slope $y'_1 = 0.25$.

The sought function will have the form:

$$y = a(1 - e^{-t/b})$$

is then to be selected so that it has the same value and the same slope for t=4 as the straight line $y_1$. This leads to two non-linear equations, which are:

$$y = a(1 - e^{-t/b}) = y_1; \text{ and}$$

-continued $$y' = \frac{ae^{-t/b}}{b}$$

After solving the equation system and inserting the values of $y_1$, $b_1$ and t, one, thus, obtains b=2.6 and a=3.03. The calculated function for CP will then read:

$$y = 3.03(1 - 3^{-0.385t})$$

and the extrapolated final value is ye=3.03.

The approximation method can be implemented with less calculating outlay than the non-linear regression, but supplies less precise results.

On the basis of the extrapolation, relatively exact values are, thus, obtained overall that largely precisely describe the final condition (after the end of the flowing, as illustrated in FIG. 3), so that one need not wait until after the final condition has, in fact, been reached (after the time te) and that the short time tm already suffices for the measurement.

Although various minor modifications may be suggested by those versed in the art, it should be understood that we wish to embody within the scope of the patent granted hereon all such modifications as reasonably and properly come within the scope of our contribution to the art.

We claim:

1. In a method for evaluating an outfed light from a light waveguide comprising providing a measuring instrument, wherein the method includes incoupling light to a light waveguide provided with a resilient coating and outcoupling light from the light waveguide, said incoupling and outcoupling including utilizing a flexional coupler which includes applying pressure for producing a curved contour of the light waveguide and measuring the amount of light coupled from the waveguide, the improvements comprising immediately measuring the light coupled from the waveguide during the application of the pressure to cause deformation of the coating of the waveguide to produce measured values, ending the measurement before reaching a final condition of the pressure-dependent deformation of the coating, and determining a final value that would be in the final condition by extrapolating from the measured values acquired during the deformation.

2. In a method according to claim 1, wherein the step of extrapolating calculates the final value with the assistance of a non-linear regression.

3. In a method according to claim 1, wherein the step of determining calculates the final value with the assistance of a linear approximation.

* * * * *